United States Patent [19]
Beckwith

[11] 3,783,341
[45] Jan. 1, 1974

[54] PHASE CONDITION INDICATING CIRCUIT

[76] Inventor: Robert W. Beckwith, 1002 Greenfield Ln., Mt. Prospect, Ill. 60056

[22] Filed: Jan. 3, 1972

[21] Appl. No.: 215,021

Related U.S. Application Data

[63] Continuation-in-part of Ser. No. 66,486, Aug. 24, 1970, Pat. No. 3,648,112.

[52] U.S. Cl. ............................. 317/27 R, 328/133
[51] Int. Cl. ........................................... H02h 3/26
[58] Field of Search .................. 317/18 R, 27 R, 47; 340/253 H; 328/133

[56] References Cited
UNITED STATES PATENTS
3,155,880  11/1964  Salina................................. 317/27 R
3,535,589  10/1970  Bourgeault......................... 317/27 R Primary Examiner—James D. Trammell
Attorney—Anthony S. Zummer

[57] ABSTRACT

A circuit for an electric polyphase system for indicating conditions of unbalance between the phases, a condition of overloading or a condition of underloading, and for providing response thereto.

2 Claims, 1 Drawing Figure

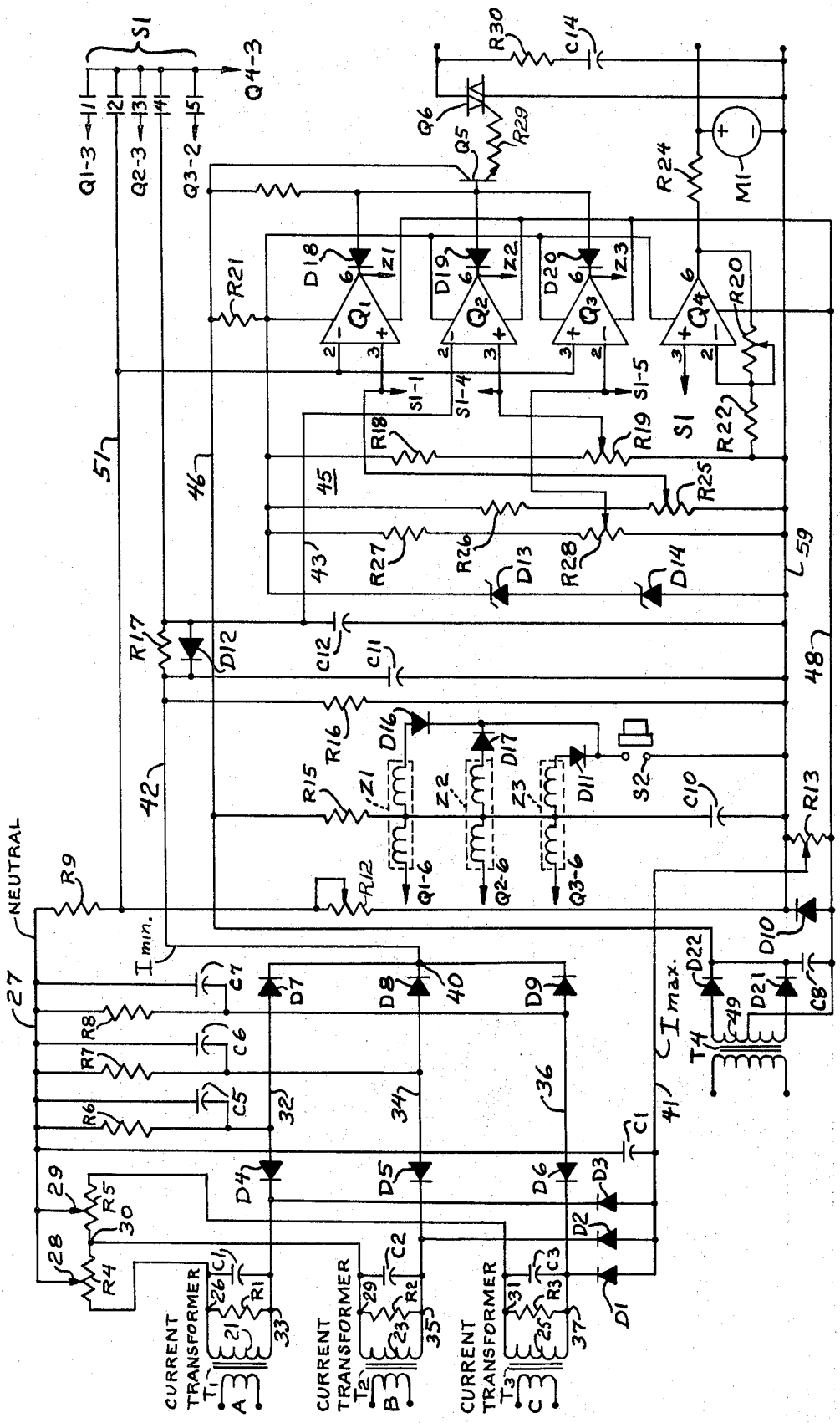

3,783,341

PHASE CONDITION INDICATING CIRCUIT

This application is a continuation-in-part application of application Ser. No. 66,486 filed on Aug. 24, 1970, now U.S. Pat. No. 3,648,112.

Phase unbalance in a three-phase electrical system may occur, for example, with unequal single-phase loading of one or two phases of the three-phase system. Such unbalance causes three-phase motors to run at temperatures above their rating with resulting deterioration of insulation and decreased life.

Phase failure, which is an extreme instance of phase unbalance, in a three-phase electrical system may occur, for example, for a number of reasons, such as when the circuit is struck by lightning, a fuse blows, or as a result of a mechanical failure which opens one line of the system. A three-phase motor which is operating at the time of a single phase failure will continue but draws increased current through the remaining two lines resulting in the possible over-heating.

More specifically, a motor may be protected by a fuse on each of the three-phase lines; and, if one fuse blows, the motor will continue to run with remaining single phase input, but will overheat, as mentioned above. Moreover, if the fuse blew due to a short circuit, the motor will generate partial voltage on the phase and feed current to the short, thereby causing probable damage and possible fire. Thus, the inventive circuit may be used to detect an unbalance which results after a blown fuse, and to trip the motor starter, removing the electrical power to the motor. Also, the inventive circuit may be used to detect unbalance on a circuit feeding a number of motors to thereby protect against a blown fuse on one motor causing damage to all motors on a circuit.

A motor may draw excessive current due to mechanical loading on the motor due to a low voltage, in which case the motor will tend to draw the required power through an increase in current or due to over-voltage where saturation of the iron may occur with or without unbalance due to other causes and to prevent damage, corrective action must be taken as a result of unbalance or over-current.

The current drawn by a motor may drop an expected value due to a loss of load. While this is not likely to damage the motor, it may well be a situation where damage to the connected mechanical load may occur. Such a case is a water well pump where the water level is drawn down to the level of the pump. The pump will then pull a mixture of water and air, a condition which can cause damage or rapid wearing of the pump impellers. To protect the combination of motor and water pump the inventive circuit can be utilized to shut the motor off on conditions of too high a current, or too low a current, or excessive current unbalance.

Accordingly, it is an object of the present invention to provide improved circuit for detecting phase unbalance in a polyphase system. The inventive circuit can be used to provide a meter indication or to actuate associate circuitry to provide an alarm, to permit balancing the load before over-heating or to automatically turn off the affected motors.

It is a further object of the invention to detect excess current in any one phase or to detect the instance where all phase currents are below an expected value and to provide responses to these conditions even though the phase currents are in a relatively well balanced relationship.

The foregoing and other features and advantages of the invention will be apparent from the following more particular description as illustrated in the accompanying drawing wherein:

The sole FIGURE shows a schematic diagram of the phase condition indicating circuit.

The inputs to the circuit of the FIGURE are coupled to the primary windings labeled as A, B, and C to indicate the input phase of current transformers T1, T2 and T3. Resistors R1, R2 and R3 and filter capacitors C1, C2 and C3 are connected across the respective secondary windings 21, 23 and 25 of transformers T1, T2 and T3. The upper (as oriented in the FIGURE) terminals 26, 29 and 31 of resistors R1, R2 and R3 are connected through trimmer potentiometers to R4 and R5 to the artificial neutral conductive lead or line 27. More specifically, terminal 26 or resistor R1 is connected through a portion of potentiometer R4 and variable tap 28 to artificial neutral line 27; resistor R2 is connected through a portion of resistor R5 and variable tap 29 to neutral line 27 such that trimmer potentiometers R4 and R5 permit the balancing of the inputs. The lower terminals 33, 35 and 37 of transformer secondaries 21, 23 and 25 are connected respectively through diodes D3, D2 and D1 to conductive lead 41.

Resistors R1, R2 and R3 together with their respective diodes D2, D1, and D3 develop a potential across capacitor C1 connected across leads 27 and 41, which is proportional to the highest or largest phase-to-neutral current, Imax.

Terminal point 33 is also connected through a diode D4 and line 32 to an RC circuit comprising a resistor R6 and capacitor C5; terminal point 35 is connected through to diode D5 and line 34 to an RC circuit comprising a resistor R7 and a capacitor C6; and terminal point 37 is connected through diode D6 and line 36 to an RC circuit comprising resistor R8 and capacitor C7. The other terminal of each of the foregoing RC circuits is connected to neutral line 27.

The combination of diode D4, resistor R6 and capacitor C5 develops a voltage at line 32 proportional to the phase A current. Similarly, the combination of diode D5, resistor R7 and capacitor C6; and, the combination of diode D6, resistor R8 and capacitor C7 develop a voltage on lines 34 and 36 respectively proportional to the phase B and phase C currents.

Lines 32, 34 and 36 are connected through respective diodes D7, D8 and D9 to a common terminal 40. The voltage on lines 32, 34 or 36 is representative of the phase currents.

Operational amplifiers Q1, Q2 and Q3 of any suitable known type available commercially, function to detect and amplify the factors Imax, Imin and Ibal. More specifically, amplifier Q1 detects the increase of the maximum phase current, Imax, above a selected level; amplifier Q2 detects Ibal, that is, an unbalance between the phase currents which exceed a selected amount; and amplifier Q3 detects minimum Imax, that is, the decrease of the maximum phase current below a selected level.

The inverting input terminal 2 of amplifier Q1 is connected through lead 51 and resistor R9 to the neutral lead 27. The second input to amplifier Q1 is connected to its non-inverting terminal 3 through the adjustable tap of resistor R25 which is connected in series with resistor R26 which two resistors are part of voltage reference network 45.

Reference network 45 which provides a stable reference potential to amplifier Q1, Q2 and Q3 includes series resistors R18 and R19 connected in parallel to series R25 and R26, which in turn are connected in parallel with series connected Zener diodes D13 and D14. Network 45 has its lower (as oriented in the FIGURE) terminal connected to lead 59 and its upper terminal connected through resistor R21, lead 46 and diodes D22 and D21 to the upper and lower terminals of the center tapped secondary winding 49 of the input power transformer T4. The center tap of secondary winding 49 is connected to lead 48.

A zener diode D10 is connected across resistor R13 and limits the potential thereacross. Diode D11 has its anode connected to lead 48 and its cathode connected through resistor R12 to lead 51. A filter capacitor C8 is connected from the center tap of secondary winding 49 in common to the cathodes of diodes D22 and D21.

Since the input to terminal 3 of amplifier Q1 is connected to a stable reference; if, the input from lead 51, representative of Imax, indicates that Imax has increased more than a selected amount, or, more correctly that a greater differential exists between the neutral lead 27 and Imax lead 41, amplifier Q1 will develop a negative output at its output terminal 6.

The output terminals of amplifiers Q1, Q2 and Q3 are connected through respective diodes D18, D19 and D20 to the base of an NPN transistor Q5. Transistor Q5 has its collector connected through lead 46 and diode D22 to the upper terminal of secondary winding 49 and through diode D21 to the lower terminal winding 49. The emitter of transistor Q5 is connected through resistor R28 to the gate of triac Q6. Triac Q6 has one electrode connected to a load such as a motor control, not shown, and its other electrode connected to lead 59. A resistor R30 is connected in series with capacitor C14 and the components are connected across the triac Q6 of power terminals.

In normal operation, transistor Q5 is biased to conduct, thereby providing current to the gate of traic Q6 to maintain triac Q6 ON. When the output terminal 6 of any one of amplifiers Q1, Q2 or Q3 drops in potential, the associated diodes D18, D19 or D20 are biased ON which in turn bias transistor Q5 OFF to cut off the gate current to triac Q6 and cause triac Q6 to turn OFF.

As mentioned above, amplifier Q2 provides an output representative of the balance or unbalance of the input phases.

Note that the inventive circuit will provide an indication of unbalanced conditions caused by voltage source unbalance, by motor impedance variations or by a grounding situation. Referring to the FIGURE, an input is coupled to the inverting terminal 2 of amplifier Q2 from the terminal 40 through lead 42, resistor R17 and lead 43. A stable reference potential is coupled to the non-inverting terminal 3 of amplifier Q2 from the adjustable tap of resistor R19. If the voltage on the lead 42 varies, more than a selected amount, the differential input to amplifier Q1 will develop a more negative potential at its output terminal 6 thereby causing triac Q6 to turn OFF in the manner described above, to thereby indicate a phase unbalance condition.

Amplifier Q3 has its non-inverting terminal 3 connected through lead 51, resistor R9 to neutral lead 27.

The inverting terminal 2 of amplifier Q3 is connected to the adjustable tap of resistor R28. If the input to terminal 2 of amplifier Q3 goes more negative than a selected amount, amplifier Q3 will develop a more negative output at its terminal 6 indicating that Imax has decreased more than a selected amount.

Amplifier Q4, which is similar to amplifiers Q1, Q2 and Q3 functions to drive a meter or recorder, M1, of any suitable type, to indicate the relative status of the phase inputs. Amplifier Q4 has its non-inverting input terminal selectively connected to switch contact assembly S1 which includes contacts 1-5. Contact 1 of switch S1 is connected to terminal 3 of amplifier Q1; contact 2 is connected to lead 51; contact 3 is connected to terminal 3 of amplifier Q2; contact 4 is connected to lead 42; and contact 5 is connected to terminal 3 of amplifier Q4. (In order to simplify the drawing, the arrowed terminals on switch S1 indicate the connections to amplifiers Q1–Q4.)

Thus, the amplifier Q4 receives a selected one of the signals coupled to the other amplifiers Q1, Q2 and Q3. The output of amplifier Q4 is coupled through resistor R24 to actuate the meter M1 to indicate the relative condition of the input.

The inverting terminal of amplifier Q4 is connected to a voltage divider feedback circuit comprising variable resistor R20 having one terminal connected to terminal 6 of its other terminal connected to resistor R22. More specifically, terminal 2 of amplifier Q4 is connected to the junction of resistor R20 and R22. Resistor R20 is several times the size of resistor R22, hence, an amplifier feedback ratio is obtained.

In normal operation, the currents of phases A, B, and C are equal. In such case, the potential representative of Imax is equal to the potential representative of Imin, and the phase currents will be balanced. Accordingly, the potential across the leads 41 and 27 will be essentially the same as the potential across each of leads 32, 34, 36 and lead 27.

Note that one of the inputs to each of amplifiers Q1, Q2 and Q3 is adjustable by taps on resistors R13, R19 R25 and R28 to thereby select reference levels for each of amplifiers Q1, Q2 and Q3. The circuit is biased and zero adjusted such that in this condition the output voltage at terminal 6 of each of amplifiers Q1, Q2 and Q3 is up. Transistor Q5 is ON and current flows through triac Q6.

An important feature of the circuit is that meter M1 measures maximum Imax current, minimum Imax current and the unbalance current Ibal. Meter M1 is self-calibrating, and meter M1 also simplifies the setting of the threshold levels at which the circuit will trip or be actuated to indicate maximum Imax current, minimum Imax current, and unbalance current condition. Any necessary adjustments can conveniently and directly be made to the circuit thus compensating for any tolerances or variables in meter M1.

If, in operation, the input to the inventive circuit causes Imax to decrease, the potential on the lead 51 will decrease. If Imax decreases more than a set amount, to said 10 percent of its rating, the relatively less positive input to terminal 3 of amplifier Q3 will cause the output terminal 6 of amplifier Q3 to become more negative and cut off transistor Q5 and triac Q6.

Conversely, if Imax increases more than a set amount, the relatively more positive potential coupled from lead 51 to the inverting terminal 2 of amplifier Q1, will cause a negative output on terminal 6 of amplifier Q1. As noted above, this will cause transistor Q5 and triac Q6 to cut off.

As seen in the center portion of the FIGURE, magnetic memory or target coils, Z1, Z2 and Z3 have one terminal connected as indicated to the output terminal 6 of amplifiers Q1, Q2 and Q3 indicate respective electrical connections.

The magnetic coils, Z1, Z2 and Z3 are each center tapped and connected to the junction of series connected resistor R15 and a capacitor C10. The upper terminal of capacitor C10 is connected to lead 59. Each of the other terminals of coil units Z1, Z2 and Z3 is connected through respective diodes D16, D17 and D11 to a common terminal of a manually activated switch S2.

When one of the operational amplifiers Q1, Q2 and Q3 has been activated in response to a non-normal circuit condition; capacitor C10 will be discharged and the left hand portion (as oriented in the FIGURE) of the respective one of the coil units Z1, Z2 and Z3 will be energized to actuate a target. Capacitor C10 remains discharged until conditions return to normal when it will recharge. When conditions return to normal switch S2 can be manually closed to permit C10 to discharge through a right hand portion of coils Z1, Z2 and Z3. Thus, the coil units Z1, Z2 and Z3 when energized will actuate or trip an indicating target, not shown, which will remain in the position to which it is activated until reset by switch S2.

An additional important feature of the invention will now be described. The prior art teaches that in using current transformers such as T1, T2 and T3 which have an iron alloy core, there is danger of permitting current to flow in the primary winding without having a short circuit, or a very low burden in the secondary winding. Contrary to such teaching, in the inventive circuit it has been found desirable to use nearly open circuited secondary windings 21, 23 and 25 in order to obtain as high a ratio of secondary voltage to input current as possible.

However, it was discovered that if the secondary winding was completely open circuited, the secondary voltage was distorted and the distortion and ratio of voltage to current varied with the primary current level.

It was further found that the capacitors C1, C2 and C3 connected across the secondary winding 21, 23 and 25 resonated the inductance at the power frequency of interest, eliminated the distortion and provided uniform ratio of secondary voltage to primary current.

However, it was found that apparently because of ferroresonant effects at a high level of input current; the secondary voltage suddenly changed to a higher value of extremely distorted voltage. Since in the circuit of the invention, the primary current was forced to be a sine wave by a large series impedance, not shown, the source of distortion was considered to be due to the transformer T1 and capacitor C1 combination.

It was further found that if the primary current was reduced by a factor greater than two, the output voltage decreased to the lower undistorted value. Further, if a primary current was established between a first threshold level at which the output voltage was at the lower value, and a second threshold level at which the output voltage was at the higher value, then sometimes a lower undistorted output results and sometimes a higher undistorted output would result.

It was found that by gradually reducing the resistance of a variable resistor connected across the secondary winding, the two current threshold values would approach each other and be the same for a critical value of resistance. Under this condition, the voltage current ratio would be consistent and would be single valued up to a specific level, where distortion would suddenly occur. The distortion would cease at the same level, each time the current was reduced.

The value of the capacitance was then reduced and a new critical value of resistance determined. The ratio of the output voltage to input current then increased in the area below the distortion theshold.

An optimum value of capacity, less than half the resonant value and a corresponding critical value of resistance was obtained. This gave a ratio greater than 5 volts per amperes and an input burden of only 0.01 volt amperes. This is a significantly lower burden than other current activated protective relays whose typical values may run in the range of 1 to 20 volt amperes.

The resultant circuit is linear to approximately 10 amperes at which current level one of phase A, B or C input circuits will go into the distorted state, before the others and will cause a false indication of unbalance. However, at this high current level the entire circuit will have already tripped, so that it causes triac Q6 to cut off as a result of overcurrent. On an industry wide standard, 5 amperes is considered a full-load. Note that the inventive circuit will operate with any standard current transformers which step any existing levels of current down to the standard 5 ampere range.

It should be appreciated that phase current conditions are detected and indicated by the circuit shown in the drawing, and that by changing the current transformers T1, T2 and T3 to voltage transformers the phase voltage conditions can be detected and indicated.

While the invention has been particularly shown and described with reference to a preferred embodiment thereof, it will be understood by those skilled in the art that various changes in form and details may be made therein without departing from the spirit and scope of the invention.

I claim:

1. A circuit for indicating unbalance between the phases in a three phase input three wire alternating current electrical line system operating at a set frequency, said circuit comprising a current transformer having an iron alloy core, primary and secondary windings for respectively connecting the three phase inputs to the indicating circuit, resistance means and capacitive means connected across said secondary windings and having an alternating current voltage appearing thereacross, said current transformer providing a first undistorted output at a first level and a second distorted output at a second level, and a threshold region existing between said first and second levels, said resistance means comprising a resistance wherein the output voltage appearing thereacross is in said threshold region, said capacitor means having a capacity less than the resonant value for the set frequency thereby to maintain a linear voltage-to-current relation from essentially a zero current to the current transformer saturation level at about the ten ampere input current level, means for developing an artificial neutral reference, means for developing signals proportional to the deviation of any of said phase inputs from said reference, means for developing signals proportional to the relative amplitudes of the various phase inputs, means for comparing said developed signals against selected levels, and means responsive to the energization of said comparing means thereby to indicate non-normal phase conditions.

2. A phase condition responsive circuit for a polyphase system comprising, in combination, transformer means connecting the three phase inputs to the indicating circuit, means for developing an artificial neutral reference, means for developing signals proportional to the deviation of any of said phase inputs from said reference, means for developing signals proportional to the relative amplitudes of the various phase inputs, means for comparing said developed signals against selected levels, means responsive to the energization of said comparing means thereby to indicate non-normal phase conditions, and magnetic memory means actuable in response to a non-normal condition.

* * * * *

PO-1050
(5/69)

UNITED STATES PATENT OFFICE
CERTIFICATE OF CORRECTION

Patent No. 3,783,341                     Dated January 1, 1974

Inventor(s)  Robert W. Beckwith

It is certified that error appears in the above-identified patent and that said Letters Patent are hereby corrected as shown below:

Column 3, Line 15, "zener" should be --Zener--.

Column 3, Line 42, "traic" should be --triac--.

Column 4, Line 61, "said" should be --say--.

Signed and sealed this 9th day of April 1974.

(SEAL)
Attest:

EDWARD M.FLETCHER,JR.                C. MARSHALL DANN
Attesting Officer                     Commissioner of Patents